US006817010B2

(12) United States Patent
Aizenbud-Reshef et al.

(10) Patent No.: US 6,817,010 B2
(45) Date of Patent: Nov. 9, 2004

(54) MONITORING MESSAGES DURING EXECUTION OF A MESSAGE FLOW

(75) Inventors: Neta Aizenbud-Reshef, Haifa (IL); Yael Shaham-Gafni, Haifa (IL); Michael Starkey, Vancouver (CA); Marc-Thomas Schmidt, Winchester (GB); Gabi Zodik, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 09/749,000

(22) Filed: Dec. 27, 2000

(65) Prior Publication Data

US 2002/0120918 A1 Aug. 29, 2002

(51) Int. Cl.[7] ................................................ G06F 9/44
(52) U.S. Cl. ...................................................... 717/127
(58) Field of Search ............................... 717/124–135; 714/47, 37–38

(56) References Cited

U.S. PATENT DOCUMENTS

| | | | |
|---|---|---|---|
| 5,740,440 A | * 4/1998 | West | 717/125 |
| 5,862,381 A | * 1/1999 | Advani et al. | 717/125 |
| 6,226,787 B1 | * 5/2001 | Serra et al. | 717/125 |
| 6,282,701 B1 | * 8/2001 | Wygodny et al. | 717/125 |
| 6,412,106 B1 | * 6/2002 | Leask et al. | 717/124 |
| 6,654,948 B1 | * 11/2003 | Konuru et al. | 717/127 |

OTHER PUBLICATIONS

Wittie. Debugging Distributed C Programs by Real Time Replay. ACM. 1988. pp. 57–67.*
Ko et al. Automated Detection of Vulnerabilities in Privileged Programs by Execution Monitoring. IEEE. 1994. pp. 134–144.*
Liao et al. A Specification Approach to High Level Program Monitoring and Measuring. IEEE. 1992. pp. 969–978.*

* cited by examiner

Primary Examiner—Wei Y. Zhen
(74) Attorney, Agent, or Firm—Gregory M. Doudnikoff (57) ABSTRACT

Provided are an execution monitoring tool, a method and a computer program product for monitoring a message processing program or system. The execution monitoring tool identifies locations within the message processing program corresponding to a predefined set of execution progress stages, and inserts execution progress report generator components at these locations. Execution progress reports (including a representation of the message contents and structure) are then sent to the execution monitoring controller which maps the report data to its own representation of the program to determine the current position within an execution program. The message contents and structure, as well as the structure of the program and the current execution position, are displayed during execution on a test system. The execution reports include the current execution status as well as the position within the execution flow.

18 Claims, 6 Drawing Sheets

Debugger Algorithm

- Upon receiving communication from a debug node:
  - Receive debug node identification
  - Receive message structure and content
  - Is there a breakpoint associated with this position?
    - Yes: display message and position indication and wait for user command.
  - Send message structure and content back to debug node
  - Send resume indication to debug node

FIG. 9

Debug Node Algorithm

- Receive message from input port
- Initiate communication with debugger
- Send identification of the debug node
- Send message structure and content
- Wait for indication to resume (from the debugger)
- Receive message structure and content from debugger
- Conclude communication with debugger
- Propagate the message (received from the debugger) to the out port

MONITORING MESSAGES DURING EXECUTION OF A MESSAGE FLOW

FIELD OF INVENTION

The present invention relates to monitoring program execution and the effects of program execution in a visual programming environment.

BACKGROUND

Visual programming techniques and tools allow computer programs to be developed by manipulation of visual images representing objects, providing an alternative to conventional alphanumeric-character-based programming languages. Such techniques and tools make the task of computer program development easier for programmers than was possible with earlier non-visual programming languages, and make programming accessible to non-expert programmers. Visual programming has enabled more rapid prototyping and application program development, and has generally enabled users to focus on what functions they want their program to perform by greatly reducing the requirement to learn about programming languages and the internal workings of a computer.

Nevertheless, it remains the case that the available visual programming tools and languages, such as VisualBasic from Microsoft Corporation, are mainly used for building a user interface (selecting and positioning user interface components such as buttons, scrollbars, etc, and scripting their behaviour). The user is often required to rely on conventional programming techniques for implementing the main business logic underneath the user interface.

As with other computer programs, programs developed using visual programming techniques require debugging, but in the past many visual programming tools have not enabled visual debugging. That is, the user has been provided with source level debug information which has required a greater level of understanding of languages and systems than the original visual programming task. More recently, it has been recognised that visual programmers should be provided with visual reporting of any problems which require debugging, thereby matching the problem reporting style to the requirements of a typical visual programmer rather than relying on non-intuitive source code level debug information.

PROGRAPH 2, described in Cox et al, "Using a Pictorial Representation to Combine Dataflow and Object-Orientation in a Language Independent programming Mechanism", Proceedings International Computer Science Conference, pp. 695–704, 1988, is one example of a visual programming environment which has integrated editing and debugging, and in which operations are represented pictorially as nodes of an hierarchical dataflow. Sets of windows can be opened to explore different levels of detail within a program and errors are responded to by opening a window containing the operation in question, flashing the relevant icon and generating an explanatory message.

To enable debugging of an hierarchical program, PROGRAPH 2 and other known visual programming tools rely on access to the program's execution stack to monitor execution of the program and hence to indicate the hierarchical structure and locations within it. A program's execution stack is the data area or buffer of the data processing apparatus on which the program is executing which is used for storing context information of the sequence of invocations for operations that are performed during execution of the program. Storing such context information during program execution is essential for successful execution of an hierarchical (or nested) program—to enable a program which jumps to a subroutine to return to the correct point in the program after executing the subroutine. The reliance of known debuggers on the execution stack is because an hierarchical program is typically "flattened" into a linear flow for execution, such that the context within the hierarchical structure of a particular point in a program is not apparent from the executing program itself (subroutines appear as macros within a linear flow). An interpreter within PROGRAPH 2 shows the state of the execution stack in a special window and can illustrate the executing operations via a set of windows showing different levels of the hierarchy. This is fine for typical visual programmers, because their programs are limited to a single system and the program execution stack is available on the same system as the development and debugging tools. However, such a debugging solution could not be used if the execution stack is inaccessible from the debugger.

Another solution which allows debugging of dataflow diagrams in a unified visual environment without repeatedly switching between build and debug modes of operation is the PANTA development framework from Metrowerks AG (formerly HIWARE AG). The user merely switches between edit and debug windows.

U.S. Pat. No. 6,055,369 discloses a visual programming apparatus for creating a program with a visual user interface made up of multiple screens, including a unit for creating a screen flow comprising a flow of processes which includes a compressed representation of each of the multiple screens. Information can be extracted from the screen flow and used to generate source code. This assists the user in understanding the association between screens and hence designing, creating and testing a visual program.

U.S. Pat. No. 5,850,548 discloses a visual programming environment based on an hierarchical data flow model. Functional code components can be constructed either using conventional programming techniques or using a visual programming language, and these components are then connected together in an hierarchical data flow model for sending "messages" to and receiving "messages" from each other. The on-screen representation of the data flow aids debugging.

SUMMARY OF INVENTION

The present invention provides improved visual execution monitoring capability for computer programs.

The invention according to a first aspect provides a visual execution monitoring tool for monitoring a message processing program or system, wherein the tool enables the contents of a message to be viewed by a user while the message processing program is being executed, enabling the user to monitor the effects of execution.

The invention according to a second aspect enables automated instrumentation of computer programs, inserting execution progress report generator components which send their reports to an execution monitoring controller when certain stages of execution are reached, such that the execution monitoring controller can use the received reports to track execution progress.

According to the first aspect of the present invention, there is provided a visual execution monitoring tool for monitoring execution of a message processing program, comprising: one or more components for generating program execution progress reports upon reaching predefined stages of program execution, the execution progress reports including a representation of the current contents of a message being processed by the message processing program, and for sending the execution progress reports to an execution monitoring controller; an execution monitoring controller which is responsive to receipt of said execution progress reports for generating, during execution of said message processing program, a visual representation of the message contents.

The message contents included in the progress reports and represented visually preferably include message data and information relating to the message structure (e.g. Header fields). This may be an XML representation of the message.

The execution monitoring tool preferably includes means for inputting a test message for testing execution of the message processing program. This may comprise a message generator which is triggered to create and input a message by user definition of message data or message headers, user selection of a message type, or reading a message from an external file. The execution monitoring tool preferably also enables a programmer to change the message content when execution is stopped at a breakpoint in the program, and thus affect further execution.

The execution progress reports preferably include current execution status information from which the execution monitoring controller can generate a visual indication of execution status, such as the occurrence of exceptions. The execution progress reports preferably also include information relating to the position within the message processing program's structure corresponding to the current stage of program execution. The execution monitoring controller preferably maintains information representing the structure of the message processing program and maps received progress reports to this structure. The execution monitoring controller then generates a visual representation of the message processing program's structure and a visual representation of the position within the program structure corresponding to the stage of program execution indicated by the received progress report data.

The execution monitoring controller preferably maintains an updated record of certain parts of the program's execution stack, updated from received execution progress reports. This preferably provides, in a storage area local to a debugger, the context of operation execution required for debugging the program. The sending of reports to the execution monitoring controller may be implemented by, for example, use of TCP/IP socket connections or storing reports on a storage medium which is accessible to both the execution progress report generator components and the execution monitoring controller, or an alternative.

According to the invention, the structure of an hierarchical visual message processing program can be displayed, together with the contents of a propagating message, during test execution. This facilitates debugging. This is particularly useful for monitoring execution of an hierarchical program which is executing on a separate system from the execution monitoring controller, since the monitoring controller will not then have access to the hierarchical program's execution stack and it is undesirable to have to rely on accessing a remote system's log records to track execution progress. The invention will also prove useful for monitoring execution of a distributed hierarchical program in which processing components of the program are executable remotely from each other, since no single system's program execution stack would then provide the full context within the program hierarchy.

According to a preferred embodiment of the invention, the visual representation of the hierarchical visual program represents processing components of the program as interconnected nodes of an hierarchical program flow. The components for generating progress reports are preferably also implemented as separate nodes of the program flow. This consistency between progress report generator components and processing components allows a visual programmer to use consistent visual programming techniques and concepts (manipulation of visual representations of separate components) to work with both types of components. Furthermore, if the execution system is separate from but connected to the system used for programming, then no change will be required to the program's execution system to handle the addition of report generator nodes and the report generator nodes need not be exposed to a normal user when the program is run.

In a preferred embodiment of the invention, the monitoring tool automatically instruments the program flow with progress report generator nodes, in response to analysing the program to identify certain program execution stages. This automated insertion of report generator nodes reduces the work involved in enabling execution monitoring.

The visual programmer is preferably provided with the capability to set breakpoints within the program at the positions of selected report generator nodes—for example at input or output terminals of processing nodes, on connections between nodes, or other significant points in the program flow. Setting of breakpoints is well known within visual programming.

The progress report generator nodes preferably include debug nodes which generate execution progress data for debugging, and the execution progress monitoring controller comprises a debug controller adapted to determine the position within an hierarchical program structure corresponding to the current state of program execution. The debug controller visually displays message contents and other information which is useful for debugging, such as an indication of the determined position.

A tool according to a preferred embodiment of the present invention is a visual programming and execution monitoring tool for developing message processing and forwarding programs, in which the processing components are represented as nodes of a visual message flow. The message flow can be debugged by executing it on a test and debug system which is connected for communication with a development system. Run-time execution can be simulated by inputting test messages to the message flow, sending execution progress reports to an execution monitoring controller, and using the controller to monitor processing of these messages and display the results to the programmer. The processing components of the test and debug execution system may be distributed across a plurality of interconnected data processing systems. In an environment in which program components may be executing on one or more systems remote from a debugger, prior art debugging solutions which rely on access to a single system's execution stack cannot be used and the alternative of a debugger which relies on accessing the log records of a remote different system would not achieve desirable performance.

According to the preferred embodiment, program development capability including debug editing capability is integrated with the execution monitoring tool, such that development and debugging can be performed without switching modes between execution monitoring and editing and without switching from a development system to an unconnected, dedicated debugging system.

A programmer wishing to debug a visual program which is represented by a message flow provides a set of input messages (for example, the programmer either defines messages, selects predefined messages or runs communicating partner test applications to generate messages), uses the execution monitoring tool to monitor the actions performed on the message during execution, and responds to any visual indications of the occurrence of exceptions by editing the program using visual programming techniques. The structure and contents of the message can be tracked at all points in the execution of the message flow and the visual program can be developed, monitored and edited within the integrated development and debugging environment until it has been verified as working properly.

Furthermore, according to the preferred embodiment, the user's view of the visual message flow representation of the developed program is consistent with the user's understanding of messages flowing between nodes of a message processing and forwarding network, and this minimizes the requirement for a visual programmer who is familiar with messaging to learn new concepts before starting programming of message flows.

Such a visual programming and execution monitoring tool can be integrated within a message broker within a messaging network, or provided as a tool for use with such a broker. This is particularly advantageous since message brokers can provide a very valuable intermediary message processing and forwarding service for application programs connected via a messaging network, particularly in complex networks, and yet message brokers are required to perform different sets of operations for different enterprises and users and different enterprises will have very different combinations of new and legacy systems which are required to interoperate via the message broker. It is therefore particularly beneficial to provide visual programming and debugging capability to enable rapid customisation of the broker and integration with other systems. A message broker framework supporting modular plug and play components can benefit greatly from the present invention. Furthermore, enterprises who have a message broker in productive use for routing and transforming messages will typically prefer a runtime simulation or a test and debugging execution system which is integrated within the development environment, rather than extending their run-time production system. This is preferred both to optimize the performance of their developers and to protect their business-critical production system from programming errors.

In a further aspect, the invention provides a method for monitoring execution progress of a message processing program, including the steps of: identifying a set of locations within the message processing program corresponding to a predefined set of execution progress points, and inserting at each of said locations a component for generating program execution progress reports when the predefined execution progress points are reached during execution of the message processing program; responsive to input to the message processing program of at least one message, initiating execution of the message processing program to process said at least one message and to generate program execution progress reports including a representation of the current message contents, and to send the reports to an execution monitoring controller; responsive to receipt of said progress reports by said execution monitoring controller, generating a visual representation of the current message contents.

In a further aspect, the invention provides a computer program (preferably implemented as a computer program product comprising program code recorded on a computer readable recording medium) for controlling a data processing apparatus on which it runs to perform a method as above.

A computer program product according to a further aspect of the invention, which comprises program code recorded on a computer-readable recording medium, implements a visual execution monitoring tool for monitoring execution of a message processing program in which the program code of the tool comprises: one or more components for generating program execution progress reports upon reaching predefined stages of program execution, the execution progress reports including a representation of the current contents of a message being processed by the message processing program, and for sending the execution progress reports to an execution monitoring controller; an execution monitoring controller which is responsive to receipt of said execution progress reports for generating, during execution of said message processing program, a visual representation of the message contents.

In a further aspect of the invention, there is provided a visual execution monitoring tool for monitoring execution of a computer program, comprising: means for identifying locations within a computer program corresponding to a predefined set of execution progress points, and for inserting at each of said locations a component for generating program execution progress reports when the predefined execution progress points are reached during execution of said program; means responsive to said components generating said execution progress reports for sending the progress reports to an execution monitoring controller; an execution monitoring controller for receiving said execution progress reports and for generating, during execution of said computer program, a visual representation of the received execution progress report data.

BRIEF DESCRIPTION OF DRAWINGS

Preferred embodiments of the present invention will now be described in more detail, by way of example, with reference to the accompanying drawings in which.

DETAILED DESCRIPTION OF PREFERRED EMBODIMENTS

An embodiment of the present invention will be described below with reference to FIG. 1 which shows a message integration architecture 10, underlying messaging support 20, and other connected computer programs 30, 40 of a data processing system within a messaging network. A visual programming and program execution monitoring tool is implemented in a Control Center component 50 of the message integration architecture 10, for developing, testing and visually debugging message flows 80 for running on a message broker 60.

Before describing the invention in detail, an introduction to message queuing, message brokers and message flows will be helpful.

The ability to rapidly adopt, integrate and extend new and existing data processing technologies has become essential to the success of many businesses. Heterogeneity and change in data processing networks has become the norm, requiring communication solutions which achieve interoperability between the different systems. Application-to-application messaging via intelligent middleware products provides a solution to this problem.

Messaging and Message Brokers

For example, IBM Corporation's MQSeries messaging and queuing product family are known to support interoperation between application programs running on different systems in a distributed heterogeneous environment. Message queuing and commercially available message queuing products are described in "Messaging and Queuing Using the MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries—Message Queue Interface Technical Reference" (IBM Document number SC33-0850-01). The network via which the computers communicate using message queuing may be the Internet, an intranet, or any computer network. IBM and MQSeries are trademarks of IBM Corporation.

IBM's MQSeries messaging products provide transactional messaging support, synchronising messages within logical units of work in accordance with a messaging protocol which gives assured once and once-only message delivery even in the event of system or communications failures. MQSeries products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt', and can be backed out atomically in the event of a failure. This message transmission protocol and the associated transactional concepts and recovery facilities are described in international patent application WO 95/10805 and U.S. Pat. No. 5,465,328.

The message queuing inter-program communication support provided by the MQSeries products enables each application program to send messages to the input queue of any other target application program and each target application can asynchronously take these messages from its input queue for processing. This provides for assured delivery of messages between application programs which may be spread across a distributed heterogeneous computer network, without requiring a dedicated logical end-to-end connection between the application programs, but there can be great complexity in the map of possible interconnections between the application programs.

This complexity can be greatly simplified by including within the network architecture a communications hub to which other systems connect, instead of having direct connections between all systems. Message brokering capabilities can then be provided at the communications hub to provide intelligent message routing and integration of applications. Message brokering functions typically include the ability to route messages intelligently according to business rules and knowledge of different application programs' information requirements, using message 'topic' information contained in message headers, and the ability to transform message formats using knowledge of the message format requirements of target applications or systems to reconcile differences between systems and applications.

Such brokering capabilities are provided, for example, by IBM Corporation's MQSeries Integrator products, providing intelligent routing and transformation services for messages which are exchanged between application programs using IBM's MQSeries messaging products.

Support for both management and development of message brokering applications can be implemented in a message broker architecture to provide functions including publish/subscribe message delivery, message transformation, database integration, message warehousing and message routing. Message flows are a visual programming technology which support all of these broker capabilities and greatly ease the task of management and development of message brokering solutions.

Message Flows

A message flow is a visual program which represents the sequence of operations performed by the processing logic of a message broker as a directed graph (a message flow diagram) between an input queue and a target queue. The message flow diagram consists of message processing nodes, which are representations of processing components, and message flow connectors between the nodes. Message processing nodes are predefined components, each performing a specific type of processing on an input message. The processing undertaken by these nodes may cover a range of activities, including reformatting of a message, transformation of a message (e.g. adding, deleting, or updating fields), routing of a message, archiving a message into a message warehouse, or merging of database information into the message content. There are two basic types of message processing nodes: endpoints and generic processing nodes. Endpoints represent points in the message flow to which message producers may send messages (input nodes) or from which message consumers may receive messages (output nodes). Endpoints are associated with system queues and client applications interact with an endpoint by reading from or writing to these queues. Generic processing nodes take a message as input and transform it into zero, one, or more output messages. Each such message processing node has a set of InTerminals through which it receives messages, and a set (possibly empty) of OutTerminals, through which it propagates the processed message. Message processing nodes have properties which can be customized. These properties include expressions that are used by the processing node to perform it's processing on input messages.

A message flow is created by a visual programmer using visual programming features of the message broker. This involves placing message processing nodes on a drawing surface, and connecting the out terminal of one node to the in terminal of another node. These connections determine the flow of the messages through the message processing nodes. A message flow can contain a compound message processing node which is itself a message flow. In this way message flows can be built modularly, and specific message processing functionality can be reused.

Message Flow Execution

Message flows are executed by an execution engine that can read a description of a message flow, and invoke the appropriate runtime code for each message processing node. This will be referred to later. Each message flow has a thread pool which can be configured to have between 1 and 256 threads. When an input node for a message flow is constructed it takes one thread from its thread pool and uses it to listen to the input queue. A single thread carries a message from the beginning of the flow through to the end, and hence the thread can be used to identify the message as it passes through the flow.

The queuing of an input message on that input queue initiates execution of the message flow on the queued message. The message is then propagated to the target nodes of the connectors originating from the output terminal of the input node. If there is more than one outgoing connector, copies of the message are created and handled independently by the subsequent nodes. If the node is an output node, the message is delivered to the associated message queue; otherwise the processing node will create zero or more output messages for each of its output terminals. Messages are propagated to subsequent nodes as described above.

A message processing node will process an input message as soon as it arrives and retain no information about the message when it has finished its processing. A processing node might output more than one message of the same type through an output terminal and several copies of the same message might be propagated if there is more than one connector originating from an output terminal; all of these messages are processed independently of each other. A processing node does not necessarily produce output messages for all of its output terminals—often it will produce one output for a specific terminal depending on the specific input message. Also, a node might produce messages for output terminals that are not connected to other processing nodes, in which case the message is not processed further.

A Message Flow Example

To illustrate the use of a message flow, a sample scenario will now be described in the context of sending stock market data between applications via a message broker. The information which the involved applications wish to share is included in the following messages:

NYSEtrade message that contains information: date, company symbol, company name, quote price, total value traded FTSEtrade message with the same information in identical format AMEXtrade message that contains date, company name, quote price and amount traded.

The information that applications want to acquire is detailed below:

Rationalized trades—all trades in a consistent data format—needed for known trading analysis application A.

Major trades—rationalized trades with 'netvalue' greater than $100,000—these can be logged in a message warehouse and delivered to application C, which connects intermittently to do historical analysis.

Price to Earnings ratio (PE) Update—triggered by earnings reports, computed and added to earning report data and delivered to application B which analyses PE changes.

Furthermore, it was decided in this example to publicize the stream of major trades.

Figure 2:
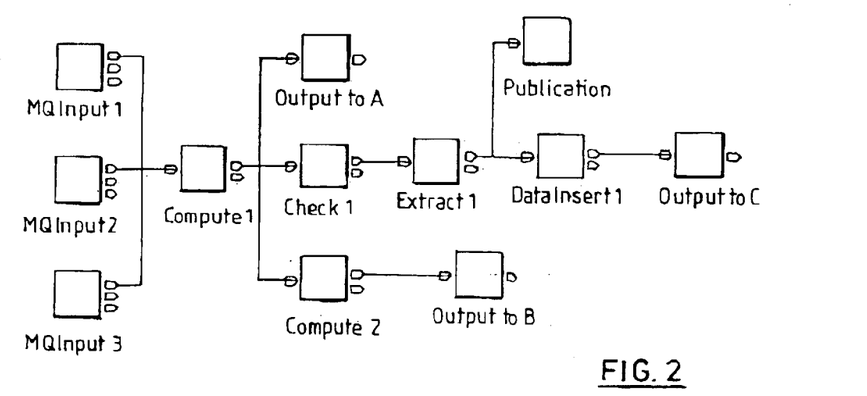
FIG. 2 shows an example message flow for processing and forwarding stock market data.

FIG. 2 shows a message flow that implements the above described functionality. To respond to the needs of each application, the message flow contains the following processing nodes:

Compute1 node—merges the matching messages from three sources into one stream, and computes extra fields to standardize stock trade information from AMEX to match that of the other stock trade publishers; converting company name to symbol may require a table lookup. A Compute node is capable of constructing a new message out of the field contents of the input message, default values, or constants.

A combination of nodes: Check1, and Extract1—that do the selection to identify major trades, i.e., test for value greater than $100,000. An Extract node derives an output message from the contents of an input message by copying only those elements of the input message which are explicitly specified. Any elements of the output message which are not explicitly specified will either have null values or will simply not exist. A Check node checks whether the format of a message arriving on its input terminal matches the specification defined by the message property attributes.

DataInsert1 node—logs the major trades in the message warehouse to make them available for intermittently connected historical analysis applications. A DataInsert node may be used to insert a new row into a table in a specified database.

Compute2 node—computes the price to earnings ratio and adds it in to the message data for application B.

Publication node—to publicize the stream of major trades. The Publication node may be used within a message flow to represent a point from which messages are "published", that is a point from which messages are transmitted to a set of subscribers who have registered interest in a particular set of messages.

Message Flow Debugger

Once a message flow has been programmed, the message flow developer's next step is to verify that the flow behaves correctly before integrating it into an operational messaging system. In order to verify the behaviour of a message flow, a developer typically wants to provide some input messages to the message flow and execute them through a debugger to see that the expected actions are executed. Using conventional source-level debuggers for this task would be difficult for typical message flow programmers. Message flow programmers want to be able to test and debug their flows within the development environment.

Figure 3:
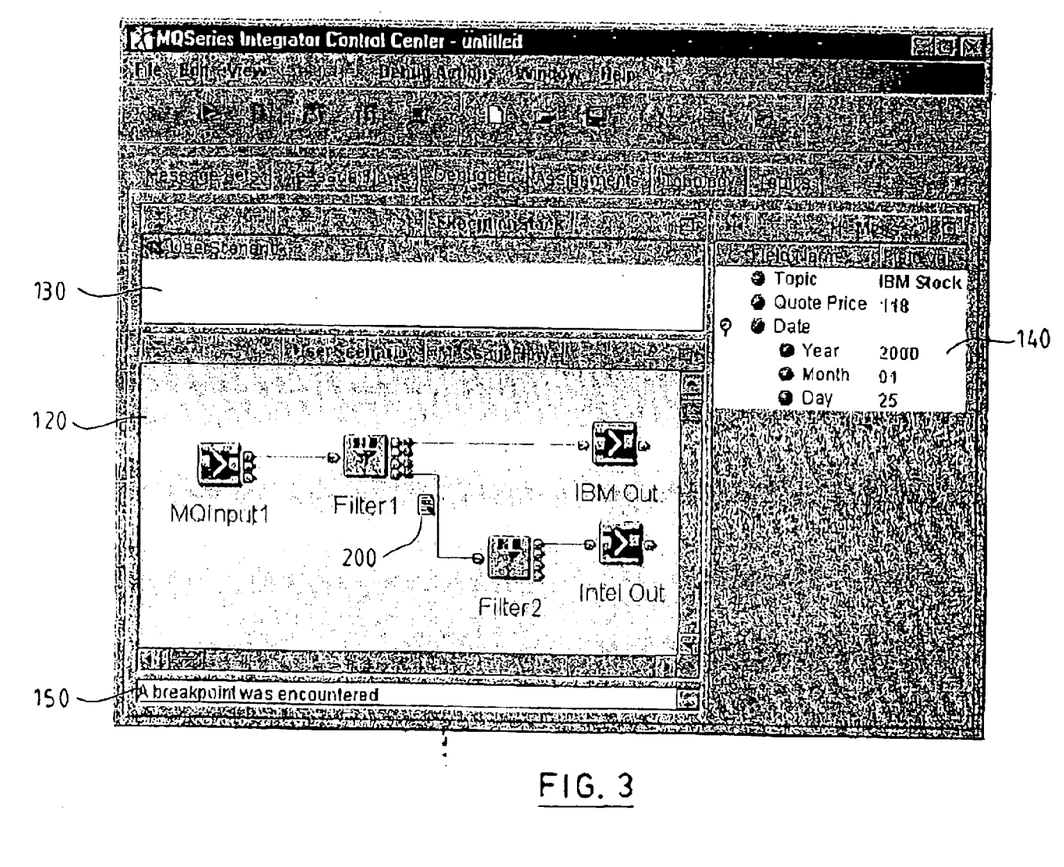
FIG. 3 is a screen shot of a GUI of an execution monitoring and debugging tool according to an embodiment of the invention.

An integrated message flow development and debugging environment according to the present invention provides a message flow developer with debug capabilities as described below together with some editing capabilities, such as modifications of the message flow structure or node properties and the ability to modify propagating messages at breakpoints during message flow execution. The debugger graphical user interface (GUI) of the message flow debugger is divided into four main parts which enable the message flow developer to track a message from the initial queue, through the message processing nodes, until it reaches the target queue. The four parts are shown in FIG. 3:

1. The Message Flow View pane 120—in which the message flow that is currently being executed is displayed. In this pane the programmer can set breakpoints, zoom into compound nodes, and inspect properties of a node. The programmer is able to see the hierarchical structure of the message flow, and the location within that structure corresponding to the current stage of execution is shown by displaying an indicator on top of the message flow diagram. How this is achieved for a message flow which is flattened for execution will be described in detail later.

2. The Execution Stack View pane 130—in which the dynamic hierarchy of the currently active message flow execution is displayed. At the initial stage of a message flow execution there is one item (corresponding to the input node of the message flow) in the stack. When execution progresses, if the node being executed is primitive it is displayed. If the executing node is compound, and the programmer steps into it, then another item is pushed onto the stack corresponding to the input node of the contained message flow. When execution of the contained flow ends, or when the programmer selects return, the corresponding item is popped from the stack. In this pane the programmer is able to switch between active compound nodes by selecting rows in the stack. The selected message flow is presented in the Message Flow View pane 120. How the execution context information is provided and stored when the development system is separate from the execution system will be described in detail later.

3. The Message Content View pane 140—in which the content of the message being propagated through the message flow is displayed.

4. The Information Bar 150—in which information on the current status of the debug session is given, such as breakpoint encountering, debug session end.

The message flow debugger includes means for controlling the debug session in terms of visually represented nodes and connections, and includes support for the following debug capabilities:

1. The ability to set/delete breakpoints. A breakpoint can be set in several locations, at all levels of an hierarchical message flow:

1.1 On an input port of a processing node, in this case execution stops before the node is performed.

1.2 On an output port of a processing node, thus execution stops after the node was performed.

1.3 On a connection between nodes, here execution stops after the connection originator node was performed and before the target node of the connection was performed.

1.4 On the entrance to a processing node (on all input ports), or on the exit from a processing node (on all output ports). A Boolean condition can be related to the contents of the message passing through the port to which the breakpoint is associated.

2. Entering input to the program. The input to a message flow is a message. The programmer can select a message type out of a set of predefined types and then fill in the content, and/or manually define message header fields based on a set of supported formats, or alternatively read an existing message from an external file.

3. The ability to inspect the message propagating through the message flow. A message inspector view displays the current content of the message at all times. The programmer is able to change the message content, once the execution is stopped at a breakpoint, and thus affect further execution. Note that the structure and contents of the message can be viewed throughout the debug session, and are updated whenever a breakpoint is reached, to show the effects on the message of the actions performed by the processing nodes.

4. Browsing through the program components. A message flow is an hierarchical program, and the programmer is able to browse through it by selecting a compound node in the message flow diagram and zooming into it.

5. Run—start/resume the execution. The program is executed until a breakpoint is encountered.

6. Step Over. Execute the next processing node and then stop.

7. Step Into. When the next processing node is a compound node, stop after executing the in terminal of the internal message flow.

8. Return. If selected when inside a compound node, go back to the containing message flow.

9. Quit. Stop the debug session.

10. Switching between active components. When execution is inside a compound node, the programmer is able to switch to the containing message flow by using an execution stack.

While the debugger is active (i.e. from the time a programmer starts a debug session to the time the programmer stops the session), the debugger is continuously in a state of waiting for a message to be placed on any of the message flow's input queues. The debugger uses a message generator to create a message from data inserted by a programmer and to place these messages into the message flow. Once a message appears on an input queue, it will progress through the flow until a breakpoint is encountered. At that point, the contents of the message will be communicated to an execution monitoring tool which displays the contents to the programmer, who will have an opportunity to change the message before continuing.

Figure 4:
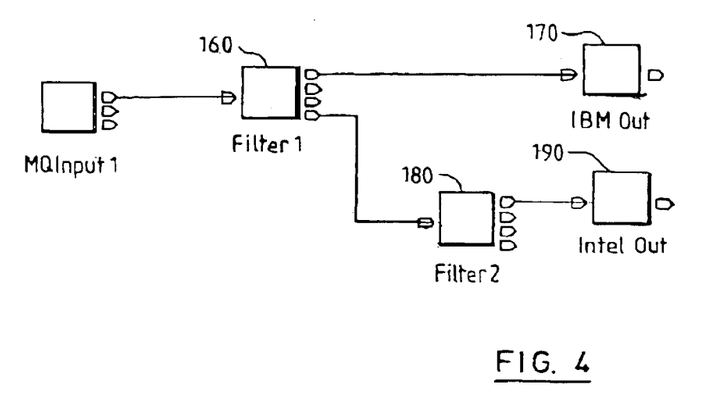
FIG. 4 shows a sample message flow.

The screen shot of FIG. 3, showing an execution monitoring and debugging tool implementing the invention, will be used to help describe a sample user scenario relating to the message flow of FIG. 4. The purpose of the message flow shown in FIG. 4 is to sort the arriving messages according to their topic into two different streams: the messages with 'IBM Stock' topic and the messages with 'Intel Stock' topic. Other messages, which do not agree with either of these topics are discarded. To sort the messages a Filter node is used. A Filter node evaluates an SQL expression against the content of the input message. The first Filter node 160 checks for messages with 'IBM Stock' topic. All messages that satisfy this condition are propagated through the 'true' output port to the MQOutput node 170 called 'IBM Out'. The messages that do not meet this condition are propagated through the 'false' output port to the second Filter node 180. The second Filter node checks for messages with 'Intel Stock' topic.

The messages that satisfy this condition are propagated through the 'true' output port to the MQOutput node 190 that is called 'Intel Out'. All other messages are not propagated since the other ports are not connected.

To check that the routing is done correctly, a message flow developer uses the debugger to generate a message with 'IBM Stock' topic, and sets a breakpoint at the exit from the first Filter node (on all output ports). The developer clicks the 'Run' button to start the debug session. Consider a situation in which a breakpoint is encountered on the 'false' port instead of on the 'true' port. This situation is shown in FIG. 3, where a visual indication 200 of the relevant breakpoint location within the message flow is presented. Whenever a breakpoint is reached during the debug session, an indication of location within the message flow is presented to the programmer. Problem identification information can also be visually displayed to the programmer (in the Information bar 150) to enable association between an identified problem and its location within the message flow.

To examine what went wrong, the developer uses the right mouse button to look at the Filter node properties which contain the SQL expression. If he finds a misspelled word he can correct it. The debug session now starts again, and the flow works correctly. Typical bugs to be handled include:

nodes connected incorrectly (outputs connected to incorrect inputs); Filter nodes with incorrect conditions; Compute nodes with incorrect logic; Database nodes which make incorrect entries in target databases; messages with contents which do not match expectations of message flow; unintended feedback loops within programs which result in infinite loops; errors in user-programmed plug-ins.

Broker Architecture

Figure 1:
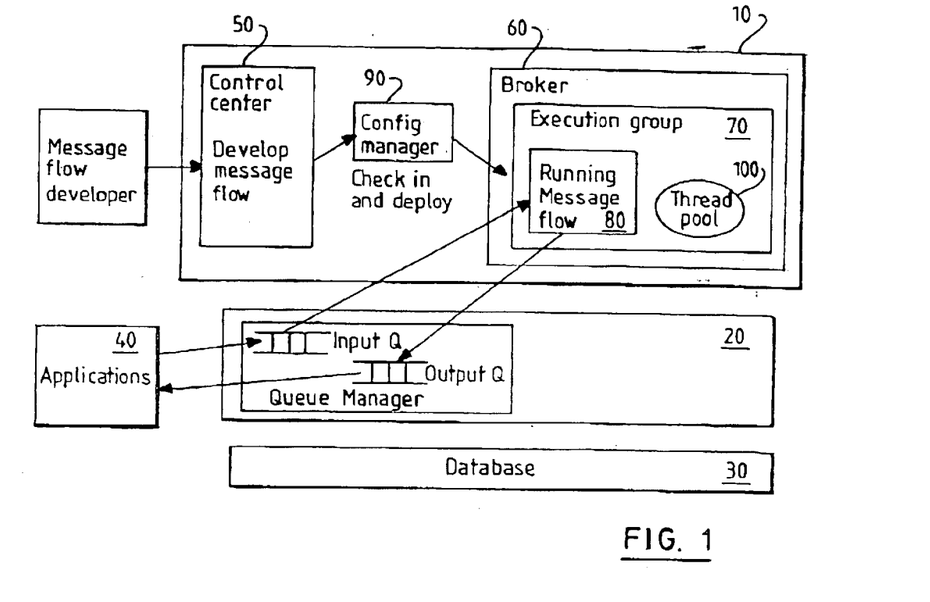
FIG. 1 is a schematic representation of a message integration framework for implementing the invention according to a first embodiment, and showing an underlying messaging support program and other connected programs for use in a data processing network.

FIG. 1 illustrates the major components of a message integration architecture according to an implementation of the present invention, and their relationships:

The broker domain, including one or more individual brokers 60 hosting execution groups 70, that in turn host message flows 80.

The Configuration Manager 90.

The Control Center 50.

A message broker 60 can comprise a set of execution environments hosting message flows arranged in execution groups that handle the message traffic. Any number of brokers can be installed and configured. Together these make up the broker domain. Each broker 60 in a broker domain may be on a different machine, or even a different geographic location.

A Configuration Manager 90 stores and manages configuration data on behalf of one or more brokers 60. It provides a single, central point of management for the domain. Individual brokers receive their configuration from the configuration manager.

The Control Center 50 implements visual programming and program execution monitoring functions according to the invention, as the first one of its three major capabilities:

1. Definition of message flows and message broker configuration, message sets, publish/subscribe topology and topics.
2. Deployment of configuration definitions to a broker domain.
3. Runtime administration of a broker domain.

The present invention focusses on the first of these capabilities, and in particular on monitoring the execution of the program in a test and debugging system.

To achieve debugging, the Control Center 50 includes: a GUI application from which an execution monitoring tool is activated to enable interactive debugging; a debug controller that is responsible for communicating with the execution engine and controlling the debug session; and a message generator for generating the test message from user-input data and providing this to the message flow. The Control Center may be on a different machine from the brokers.

Figure 5:
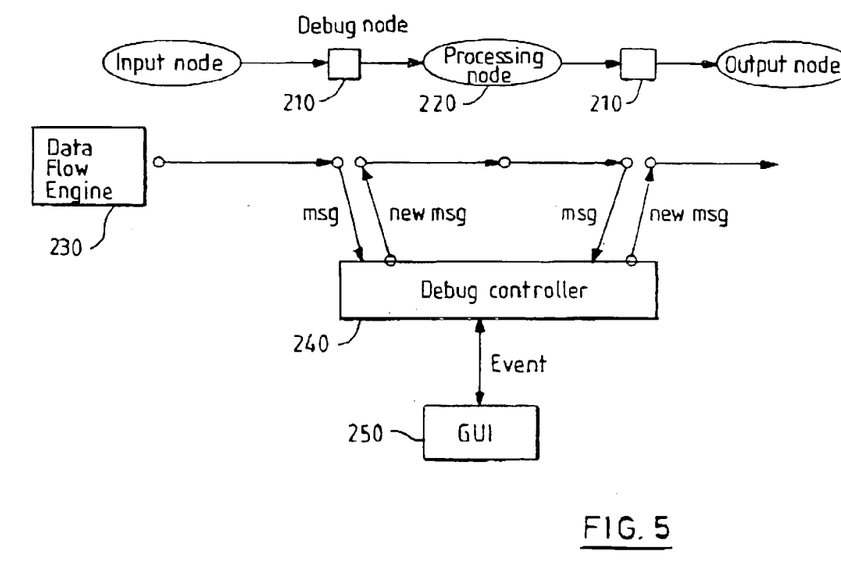
FIG. 5 shows the relationships between components of the debugger.

FIG. 5 shows the relationships between these debugging components of the Control Center. Debug nodes 210 (described later) are inserted between each processing node 220 in a target message flow, and each of these is responded to by the execution engine 230 by invoking a communication with the debug controller 240 every time a message passes through them (for example using TCP/IP communications, or placing information in shared storage which is accessible to both the debug controller 240 and the debug nodes 210, or any alternative). In certain implementations of the invention, they also communicate with the debug controller once the message flow has completed delivery of the message, as the chain of message propagate calls unwinds. In the forward direction, a debug node communicates the node's unique identifier (this, possibly with an identifier of the original containing message flow, is sufficient context information to determine the location within an hierarchical message flow since an execution stack is built up—as described later), an indication of execution status, and an XML (eXtensible Markup Language) version of the message which shows the message structure and contents. The debug controller checks the debug node's identifier and, if it corresponds to a breakpoint set by the user, then the debug controller displays the message in the GUI 250 and permits the user to change it. When the breakpoint is stepped out of, the edited message is sent back to the debug node and substituted for the original message.

In an alternative to the embodiment of the invention described above, the debug nodes themselves contain a breakpoint attribute to determine which debug nodes are associated with breakpoints, and the debug nodes only communicate with the debug controller when breakpoints are reached instead of every time a message passes through them.

The communication between the control center and the configuration manager, and between the configuration manager and the broker domain is performed by using the underlying support of the messaging system (such as IBM's MQSeries message queue manager software—not depicted in FIG. 5). Applications communicate with the broker by sending messages directly to the queues hosted by the queue manager associated with the broker.

A typical scenario of the lifetime of a message flow would be:

1. A message flow developer uses the visual programming editing and debugging capabilities of the Control Center to design a new message flow and to verify that it executes correctly. The message flow is then presented to the configuration manager.
2. The message flow is assigned by the domain expert to a specific execution group (hosted by a message broker).
3. The system administrator deploys this configuration to a broker domain, to make it work as part of the messaging system. This is done via a control center command, which communicates with the configuration manager, which in turn communicates with the specific broker.
4. The message flow is now running on the broker, and is ready to process messages. Once a message is received on the queue associated with the message flow input, this message is propagated through the message flow. The message flow continues to process messages until it is taken out of deployment.

Implementing Debugging Capabilities within the Broker Architecture

A significant aspect of the invention is to allow the developer to monitor the propagation of messages through a message flow while it is executing in a test and debugging system which is separate from the run-time production environment.

Implementing such functionality could be done by extending the runtime environment with debugging capabilities (that is, designing a runtime architecture that allows debugging actions, and can run in two modes: debug and production). However, the procedure for putting a message flow into operational use can be quite complex, typically requiring the co-operation of different roles. It is desirable to avoid a message flow developer having to go through this procedure each time he/she wants to test a message flow under development, and it is also desirable to avoid integrating a message flow into an operational production system until its behaviour has been verified. Additionally, it is advantageous when implementing monitoring capabilities in an existing runtime environment which does not have debugging capabilities to minimize changes to that environment. Furthermore, if such debug capabilities were implemented in the runtime environment they could not be turned on globally, such that a mechanism would be needed to allow message flows in production to continue running in production mode, while other message flows were being tested in debug mode.

Figure 6:
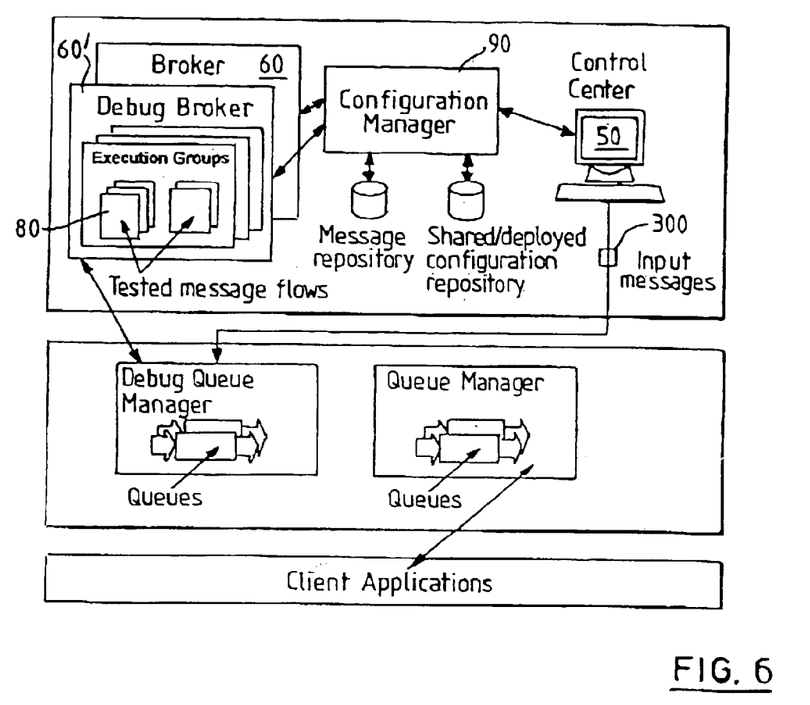
FIG. 6 shows the architecture of an embodiment of the invention in which a debugging system is separated from a run-time development broker framework.

For these reasons, testing and debugging activities are separated from the run-time production system, and the deployment procedure is not exposed to the developer. Such a solution is depicted in FIG. 6. Separation of testing and debugging activities from the operational messaging system can be achieved by installing a broker 60' on a testing and debugging system that is linked to the development system, and having the debugger automatically go through the deployment procedure each time the developer clicks the "run" button. Messages 300 can be sent to the debug broker 60' in order to launch the execution of a message flow 80 on a specific message.

A preferred solution is to leave the runtime environment substantially unchanged, and introduce special "debug instructions" into the message flow 80 being tested. To achieve this, the special debug nodes 210 (mentioned previously in relation to FIG. 5) have been designed and implemented. When the developer wishes to debug a message flow, the development environment automatically instruments the original message flow with these debug nodes, inserting a debug node between every two connected original processing nodes and after every out terminal of a debug node that is not connected to any other node. This instrumented flow is then deployed to the testing and debugging system, and is executed in the same manner as any other message flow. The runtime environment is oblivious to the fact that this flow is being monitored.

The special debug nodes 210 issue calls to the debug controller 240 via a communication manager (the debug controller, which is part of the development environment, usually resides on a different machine from the program being executed), passing information about the execution status (reporting the occurrence of exceptions), execution position including the identity of the debug node, and an XML version of the structure and contents of the message currently being propagated through the message flow. This data is sent each time a debug node is reached during execution (but alternative implementations are possible— see later). The debug controller responds to breakpoints and programmer actions and then returns control to the execution engine 230.

The debug nodes according to this first embodiment of the invention retain no information about a message after processing the message—merely passing information to the debug controller which accesses information about breakpoints and the structure of the message flow. A message flow is stored in the debug controller as a DOM (Distributed Object Model) element in XML, and this element includes the hierarchical structure of the message flow. The root element is the message flow and this contains child elements for every node and connection in the message flow. For compound nodes, such a child element can also be hierarchical—i.e. containing child elements that represent its contained nodes and connections. Every node in this structure has a unique ID attribute. When the debug controller communicates with the debug node, this ID is sent from the debug node to the debug controller, enabling it to identify the location of execution within the message flow.

The debug controller stores the information received from debug nodes in an area of storage corresponding to an execution stack, and can compare the current position in the execution stack with the previously stored information structure of the message flow to determine the current position within the message flow. A visual representation of the message flow is constructed by inspecting the message flow structure and drawing a node icon for each node and a link for each connection. A visual representation of the current execution position within the message flow preferably involves displaying an icon adjacent the position of a breakpoint when the execution reaches that breakpoint.

The implementation described above is acceptable for embodiments in which only one message is passing through a message flow at any time. An alternative implementation is available for more complex message flows with multiple input nodes and/or complex nesting of filter nodes, which reduces communication delays between system components by providing debug nodes with a "breakpoint" attribute such that they do not need to communicate with the debug controller to establish whether they are breakpoints. If debug nodes themselves can also keep track of the execution stack, they can communicate with the debug controller when a breakpoint is reached such that the stack can then be displayed to the programmer at the breakpoints. The debug nodes 210 still update their copy of the stack every time a debug node is reached, but the stack's current state is only transmitted to the debug controller 240 at breakpoints. The reduction of communication of this implementation may be balanced by greater complexity implementing dynamic changes to a message flow while a message is being propagated, including to change breakpoints while the flow is stopped at a breakpoint.

Figure 7:
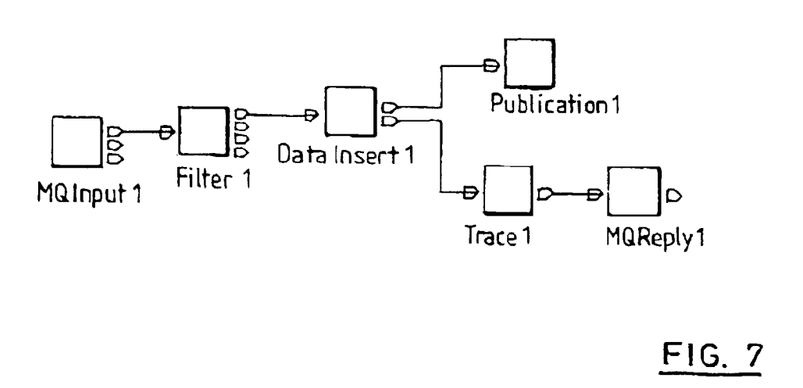
FIG. 7 shows an example message flow.
Figure 8:
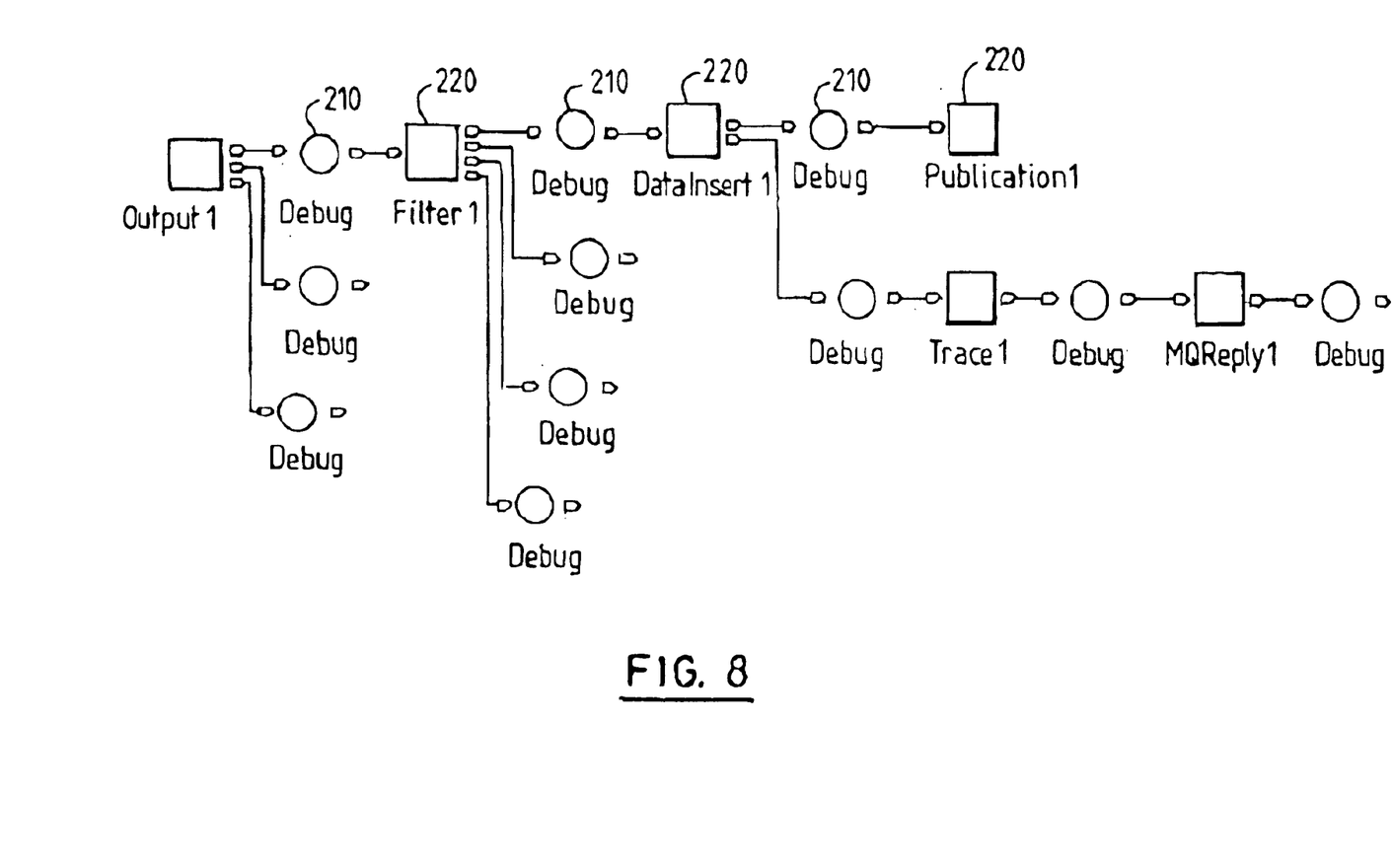
FIG. 8 shows the message flow of FIG. 7 after insertion of debug nodes.

FIG. 7 shows an example message flow that a developer may want to debug. FIG. 8 shows the same message flow instrumented with the special debug nodes 210. A debug node is added on every connection connecting two processing nodes 220, and also added on every out port that is not connected.

Advantages of this approach are:

The runtime environment (which may be complex) can be left unchanged.

The changes/additions required to the message flow authoring environment are small.

Debugging capabilities are achieved using the same concepts of processing nodes, so there is no need to introduce new special mechanisms for debugging and monitoring.

The runtime environment does not require different modes for regular execution and debug mode to enable instrumented flows to be executed in parallel to regular flows.

A debug node has one in port, and one out port. Usually, the debug node propagates the message received on the in port to the out port, and does not change the message. For debugging purposes, the debugger user may edit the message in the debugger. In this case, the debug node receives the edited message from the debugger, and propagates this changed message to the out port.

Figure 9:
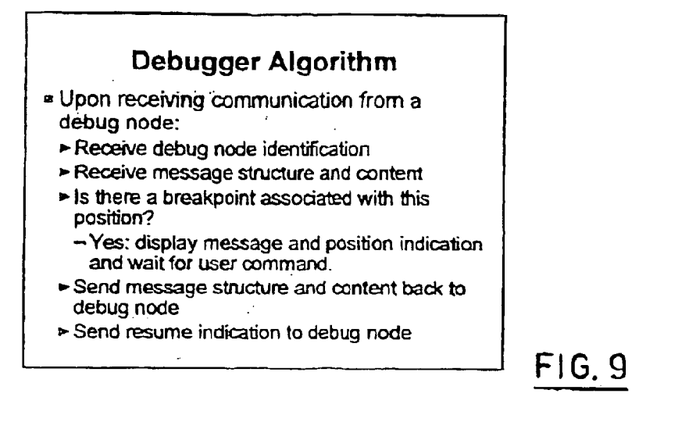
FIGS. 9 and 10 show the communication protocol of a debug processing node and the debugger controller, respectively, according to an embodiment of the invention.
Figure 10:
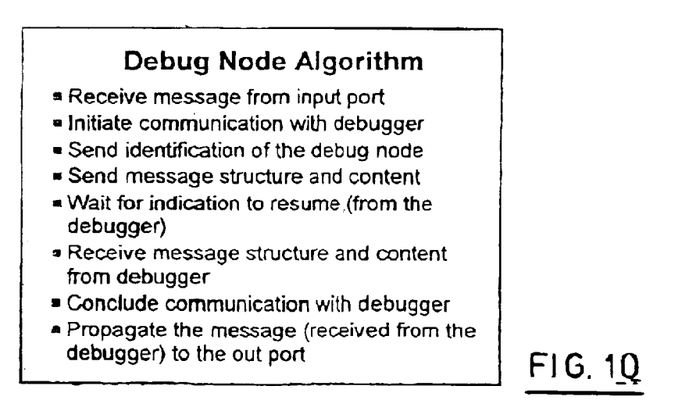

FIGS. 9 and 10 show the communication protocol between a debug processing node and the debug controller, when a debug node is encountered by the runtime engine.

Monitoring Execution of Hierarchical Message Flow

Message flows are developed using an hierarchical paradigm. A message flow is built of message processing nodes which in turn can be message flows. These are denoted compound message processing nodes. Compound message processing nodes are similar to subroutines in conventional programming languages. When a message flow is deployed, it goes through a process of flattening, similar to inlining for conventional code. The result is a flat message flow in which all compound nodes have been expanded. The flattened flow is the flow actually executed, while the developer conceptually expects the flow to be executed as a nested hierarchy, i.e. when a compound message flow is encountered a "function call" is expected to occur to start a subroutine.

The present invention provides a solution to the problem of how to present the programmer with a hierarchical view of the execution, despite the hierarchical structure being hidden in a flattened message flow and despite the likelihood that the message flow will be executed on a system remote from the control centre.

A conventional solution would be to install a debugger on the same system as the program will be executed on, such that the execution stack of a hierarchical program flow being monitored is available to determine a current position within the hierarchical flow. Each time a processing node is executed, the flow corresponding to a "subroutine" (the inner flow at this nesting level of the overall hierarchical flow) is pushed onto the stack, and it's diagram replaces the diagram of the "calling" flow. However, the conventional execution stack is not available to a remote debug controller and in the present embodiment, the system used for test execution and the system running the debugger are interconnected but separate.

The present invention uses the progress report generator nodes 210 to send execution progress information to the debug controller 240 of the control centre, and the debug controller maintains information representing the hierarchical structure of the message flow, maps the received progress information to the hierarchical structure, and generates a visual representation of execution progress.

Figure 11:
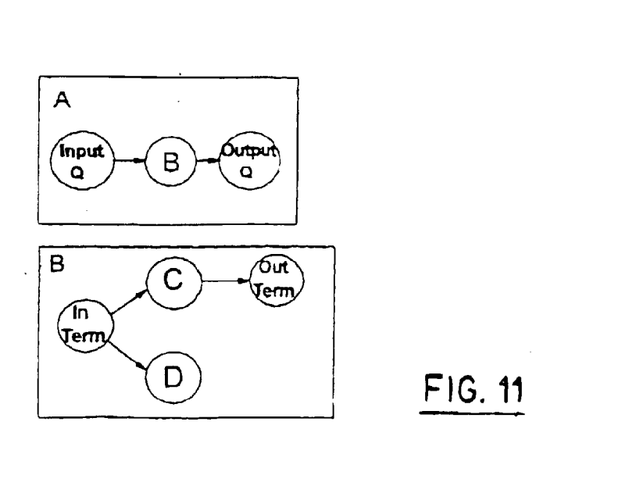
FIG. 11 shows an example nested message flow.

It is advantageous to limit the processing delays associated with sending the progress reports and yet the programmer wants as much information as possible, so a balance is required as discussed above. Additionally, the semantics of execution of message flows require careful tracking of execution progress. Execution of a message flow follows paths through the message flow. A path is a sequence of processing nodes in the flattened message flow. When we try to track this path back to the original message flow, we see that the execution path can leave a nesting level before all the processing in that level has finished. The example message flow of FIG. 11 demonstrates this situation:

In this example, one possible execution sequence might be:

A::InputQ→
B::InTerm→B::C→B::OutTerm→A::OutputQ→B::D.

As we can see, the execution path leaves the nested flow B before node B::D is executed. Execution later returns to B to finish the processing of node B::D. Making an analogy to conventional programming, this can be compared to a subroutine that can also be entered via a goto statement.

A problem arises regarding how to display the execution stack to the developer when such a "goto" situation occurs, if the only context information received from a debug node is its identifier and the name of its original containing flow.

A first solution according to an embodiment of the invention is based on an execution algorithm which is adapted to facilitate monitoring of message flows. According to this message flow execution algorithm, execution proceeds forward in the sequence of message processing nodes until an endpoint is encountered. When an endpoint is encountered, execution backtracks on the execution path until a new forward branch is found. Then execution proceeds forward on this new branch, and so on.

In order to simulate and keep-track of the stack status during the execution of a flat flow, two execution stacks can be maintained, one for the forward direction, and the other for backtracking.

Forward Stack—keeps the execution depth status when execution is going forward.

Backward Stack—keeps the execution depth status when execution is going backward.

The debug node performs two communications with the development environment: once when it is entered (when execution is going forward) and once just before it is exited (when execution is backtracking). These "synchronization points" with the development environment are:

debugNodeReached—on entry
debugNodeExit—on exit

The following Boolean properties are defined for debug nodes:

afterIn—a debug node that is immediately after an in terminal, i.e. on an edge coming out of an in terminal (immediately after a compound message flow is entered).

beforeOut—a debug node that is just before an out terminal, i.e. on an edge coming into an out terminal just before a compound message flow is left).

beforeCompound—a debug node that is just before a compound node, i.e. on an edge coming into a compound node.

aftercompound—a debug node that is immediately after a compound node, i.e. on an edge coming out of a compound node.

The debug controller of the development environment keeps a record of the "execution direction" which can be either forward or backward.

The Forward Stack is the stack that is displayed to the developer at all times. The Backward Stack is only used to track the location of the execution in the hierarchical flow.

The algorithm that controls the nesting levels while execution proceeds along paths is as follows:

```
Initialize both stacks to an empty stack
Initialize direction to forward
While not end of debug session
    on debug node entrance
        if execution is going forward
            if ( debugNode.afterIn ) push the current
    message flow to the
            Forward Stack
                if ( debugNode.afterCompound ) pop a message
    flow from the            Forward Stack
        else (execution is backtracking)
            direction = forward
            Forward Stack = Backward Stack
    on debug node exit
        if execution is going forward
            direction = backward
            Backward Stack = Forward Stack
        else (execution is backtracking)
            if ( debugNode.beforeOut ) push the current
    message flow to the Backward Stack
                if ( debugNode.beforeCompound ) pop a
    message flow from the Backward Stack
```

The advantages of this solution are that it requires a minimal amount of static analysis of the message flows and utilizes the existing infrastructure.

In a second embodiment of the invention, which provides more detail to the programmer, the example of FIG. 11 is modified to include an additional direct connection in C from the input terminal to the output terminal of C.

The execution sequence of FIG. 11 can then be represented as follows:

Where MQInA is the input queue of message flow A; MQOutA is the output queue of A; InB is the input terminal of compound node B; OutB is the output terminal of B; InC and OutC are the input and output terminals of C; InD and OutD are the input and output terminals of D; and d1 to d11 are debug nodes.

A variant on the previous example is as follows:

There are three contexts from C in which D can get executed:
1) InC--d3→C1 calls D
2) InC--d3→C1--d4→C2 calls D
3) InC--d12→C2 calls D The solution according to this second embodiment does distinguish (2) from (1) and (3), but it does not distinguish between (1) and (3). It is desirable to hold on the context stack an indication of the node that causes the call to D, not just the fact that D was called. Thus, it is preferred that the 'push' of D onto the stack does not happen from the first debug point (d10) in D, but happens from the beforeCompound debug points in C (d3, d4 and d12).

This is a significant enhancement as flows get more complex, both in the number of subflows and more particularly for instances of the same subflow and different paths to the same subflow instances.

The system according to this embodiment is implemented with a single stack that contains an identification of all 'currently executing' nodes. (Double stacks are only needed in implementations that require backtracking).

A marker is included on the stack to indicate the difference between transfer within a flow and call to another flow. Although just a single stack, it holds more information that the two stacks of the first embodiment, as the markers effectively turn it into a stack (to identify node hierarchy) of stacks (to identify exact flow context within current and all calling compound nodes).

An 'afterIn' debug node pushes a stack mark and an ID for its predecessor node on entry, and pops them on exit.

A 'before' debug node pushes an ID for its successor node on entry, and pops it on exit.
(applies to beforeCompound, beforeOut and beforeSimple)

A node may stack more than one set of items: e.g. d3 is both afterIn and BeforeCompound Thus, the implementation of a debug node becomes:

```
if afterIn then              //'
    push marker              '
    push id(previousNode)    '
    end                      ' entering
trace input information      '
if before then               '
    push id(sucessorNode)    //.
    call sucessorNode        ' real call
    pop id(sucessorNode)     //'
    end                      '
trace return information     ' exiting
if afterIn then              '
    pop id(previousNode)     '
    pop marker               //'
```

The stack will grow as follows:
d1>: MQInA B1
d3>: MQInA B1|InB C1
d6>: MQInA B1|InB C1|InC D1
d10>: MQInA B1|InB C1|InC D1|InD X
d11>: MQInA B1|InB C1|InC D1|InD X OutD
d11<: MQInA B1|InB C1|InC D1 |InD X
d10<: MQInA B1|InB C1|InC D1
d6>: MQInA B1|InB C1|InC D1
d3>: MQInA B1|InB C1
d1>: MQInA B1

This stack very closely models the run time method call stack that exists in the broker during run-time execution.

Significant advantages of a message flow debugger according to the preferred embodiments of the present invention are as follows:
1. The ability to check the message flow as part of the message flow development environment while working with concepts that are familiar to the message flow developer (i.e. processing nodes and messages)
2. The ability to inspect the message content at any point during the execution through the message flow
3. Enabling the programmer to delay integrating the message flow to the production messaging system until it is verified as working properly.

This provides far better usability for programmers than the alternative of keeping a dedicated messaging system which is not connected with the development system and is for debugging purposes only. In this case, the developer will have to perform the debugging based on information he would have to extract from the log files produced by the message broker, if available at all.

An example usage scenario for an implementation of the invention is as follows:
1. Message flow developer moves to the debugger page in the development environment and selects a message flow to debug from the list of available message flows.
2. Select/define an input message that will be propagated through the message flow during the debug session. This message can be defined in several ways: by selecting a message type and then typing in its contents or by reading an XML message from a file.
3. In most cases, although this is not mandatory, the next step users will perform is to set one or more breakpoints on the message flow in order to track the message content. A breakpoint can be set on every connection between processing nodes or on an input/output port of a processing node.

4. Run the message through the flow

5. During the execution of the message by the broker the programmer can perform the following activities Inspect the message content Update the message content once the execution is stopped at one of the breakpoints Continue execution Step over the following processing node Step into the following processing node Return Restart Quit execution It will be appreciated by persons skilled in the art that the detailed descriptions of preferred embodiments of the invention provided above are by way of example only and that variations and modifications, including different combinations and subcombinations of the described features, are within the scope of the present invention as set out in the claims.

What is claimed is:

1. A visual execution monitoring tool for monitoring execution of a message processing program, comprising:

one or more components for generating program execution progress reports upon reaching predefined stages of program execution, the execution progress reports including a representation of the current contents of a message being processed by the message processing program, and for sending the execution progress reports to an execution monitoring controller;

an execution monitoring controller which is responsive to receipt of said execution progress reports for generating, during execution of said message processing program, a visual representation of the message contents.

2. A visual execution monitoring tool according to claim 1, including a message generator which is responsive to user input to create a message and to invoke the message processing program to process the message.

3. A visual execution monitoring tool according to claim 1, including means for setting breakpoints within the message processing program and means for modifying the message contents when execution is stopped at a breakpoint.

4. A visual execution monitoring tool according to claim 1, wherein the execution progress reports include an indication of the current execution status and the execution monitoring controller is adapted to generate a visual representation of the current execution status.

5. A visual execution monitoring tool according to claim 1, wherein the execution progress reports include information relating to the position within the message processing program structure corresponding to the current stage of program execution and the execution monitoring controller is adapted to generate a visual representation of this position within the message processing program structure.

6. A visual execution monitoring tool according to claim 1, wherein the execution monitoring controller includes means for analyzing the message processing program to identify a set of locations within the message processing program corresponding to a predefined set of execution progress points and to insert the components for generating program execution progress reports at said locations.

7. A method for monitoring execution progress of a message processing program, including the steps of:

identifying a set of locations within the message processing program corresponding to a predefined set of execution progress points, and inserting at each of said locations a component for generating a program execution progress report when the predefined execution progress point is reached during execution of the message processing program;

responsive to input to the message processing program of at least one message, initiating execution of the message processing program to process said at least one message and to generate program execution progress reports including a representation of the current message contents, and to send the reports to an execution monitoring controller;

responsive to receipt of said progress reports by said execution monitoring controller, generating a visual representation of the current message contents for display to a user.

8. A computer program product comprising program code recorded on a computer-readable recording medium, for monitoring execution of a message processing program, comprising:

one or more components for generating program execution progress reports upon reaching predefined stages of program execution, the execution progress reports including a representation of the current contents of a message being processed by the message processing program, and for sending the execution progress reports to an execution monitoring controller;

an execution monitoring controller which is responsive to receipt of said execution progress reports for generating, during execution of said message processing program, a visual representation of the message contents.

9. A data processing system including a visual execution monitoring tool for monitoring execution of a message processing program, the execution monitoring tool comprising:

one or more components for generating program execution progress reports upon reaching predefined stages of program execution, the execution progress reports including a representation of the current contents of a message being processed by the message processing program, and for sending the execution progress reports to an execution monitoring controller;

an execution monitoring controller which is responsive to receipt of said execution progress reports for generating, during execution of said message processing program, a visual representation of the message contents.

10. A visual execution monitoring tool for monitoring execution of a message processing program, the execution monitoring tool comprising:

means for identifying locations within the message processing program corresponding to a predefined set of execution progress points, and for inserting at each of said locations a component for generating a program execution progress report when the predefined execution progress point is reached during execution of the message processing program;

means responsive to input to the message processing program of at least one message, for initiating execution of the message processing program to process said at least one message and to generate program execution progress reports including a representation of the current message contents, and to send the reports to an execution monitoring controller;

means responsive to receipt of said progress reports by said execution monitoring controller, for generating a visual representation of the current message contents for display to a user.

11. A computer program product comprising program code recorded on a computer-readable recording medium, for monitoring execution of a message processing program, comprising:

means for identifying locations within the message processing program corresponding to a predefined set of execution progress points, and for inserting at each of said locations a component for generating a program execution progress report when the predefined execution progress point is reached during execution of the message processing program;

means responsive to input to the message processing program of at least one message, for initiating execution of the message processing program to process said at least one message and to generate program execution progress reports including a representation of the current message contents, and to send the reports to an execution monitoring controller;

means responsive to receipt of said progress reports by said execution monitoring controller, for generating a visual representation of the current message contents for display to a user.

12. A data processing system including a visual execution monitoring tool for monitoring execution of a message processing program, the execution monitoring tool comprising:

means for identifying locations within the message processing program corresponding to a predefined set of execution progress points, and for inserting at each of said locations a component for generating a program execution progress report when the predefined execution progress point is reached during execution of the message processing program;

means responsive to input to the message processing program of at least one message, for initiating execution of the message processing program to process said at least one message and to generate program execution progress reports including a representation of the current message contents, and to send the reports to an execution monitoring controller;

means responsive to receipt of said progress reports by said execution monitoring controller, for generating a visual representation of the current message contents for display to a user.

13. A visual execution monitoring tool for monitoring execution of a computer program, comprising:

means for identifying locations within a computer program corresponding to a predefined set of execution progress points, and for inserting at each of said locations a component for generating program execution progress reports when the predefined execution progress points are reached during execution of said program;

means responsive to said components generating said execution progress reports for sending the progress reports to an execution monitoring controller;

an execution monitoring controller for receiving said execution progress reports and for generating, during execution of said computer program, a visual representation of the received execution progress report data.

14. A visual execution monitoring tool according to claim 13, including means for setting breakpoints during program execution, wherein the identified locations corresponding to a predefined set of execution progress points comprises all possible breakpoint locations within the computer program.

15. A visual execution monitoring tool according to claim 13, wherein the execution progress reports include execution status information and information relating to the position within the program structure corresponding to the current stage of program execution, and wherein the execution monitoring controller is adapted to generate a visual representation of the position within the program structure and a visual representation of the execution status information.

16. A visual execution monitoring tool according to claim 13, in which said execution monitoring controller maintains a representation of the structure of the computer program as a sequence of interconnected nodes in which individual nodes represent processing components of the program, and wherein the progress reports include an identifier of a node associated with the currently executing processing component.

17. A visual execution monitoring tool according to claim 16, wherein the information relating to the position within the program structure includes a node identifier and the execution monitoring controller saves this information to an execution stack so as to record information tracking a sequence of positions within the program structure corresponding to an executed processing sequence.

18. A visual execution monitoring tool according to claim 16, in which the components for generating progress reports are also represented as nodes within the program structure.

* * * * *